United States Patent [19]

Willner et al.

[11] 3,899,394

[45] Aug. 12, 1975

[54] PRODUCTION OF ANTIBACTERIAL AGENTS

[75] Inventors: David Willner, Dewitt; Leonard Bruce Crast, Jr., Clay, both of N.Y.

[73] Assignee: Bristol-Myers Company, New York, N.Y.

[22] Filed: Feb. 21, 1974

[21] Appl. No.: 439,508

Related U.S. Application Data

[63] Continuation-in-part of Ser. No. 318,340, Dec. 26, 1972.

[52] U.S. Cl..................... 195/29; 195/30; 195/36 R
[51] Int. Cl.² ........................................... C12D 1/00
[58] Field of Search ......... 195/80, 81, 29, 30, 36 R, 195/36 P

[56] References Cited
UNITED STATES PATENTS 3,759,904    9/1973    Crast............................... 260/243 C

*Primary Examiner*—Lionel M. Shapiro
*Assistant Examiner*—Robert J. Warden
*Attorney, Agent, or Firm*—Herbert W. Taylor, Jr.

[57] ABSTRACT

7-[D$\alpha$-Amino-$\alpha$-(p-hydroxyphenyl)acetamido]-3-(1,2,3-triazol-5-ylthiomethyl)-3-cephem-4-carboxylic acid and its nontoxic, pharmaceutically acceptable salts exhibit highly desirable solubility in water, are efficiently absorbed on oral administration to provide relatively high and prolonged blood levels and are potent antibacterial agents useful in the treatment of infectious diseases in animals, including man, caused by many Gram-positive and Gram-negative bacteria.

7-[D-$\alpha$-Amino-$\alpha$-(p-hydroxyphenyl)acetamido]-3-(1,2,3-triazol-5-ylthiomethyl)-3-cephem-4-carboxylic acid is prepared, for example, by contacting methyl D-(-)-$\alpha$-amino-$\alpha$-(4-hydroxyphenyl)acetate or an acid addition salt thereof with 7-amino-3-(1,2,3-triazol-5-ylthiomethyl)-3-cephem-4-carboxylic acid or a salt thereof in aqueous solution in the presence of enzyme derived from a microorganism selected from the group consisting of *Xanthomonas citri* (IFO 3835), *Acetobacter turbidans* (ATCC 9325) and *Pseudomonas melanogenum* (IFO 12020).

10 Claims, No Drawings

/ 1

PRODUCTION OF ANTIBACTERIAL AGENTS

CROSS-REFERENCE TO RELATED APPLICATION

This application is a continuation-in-part of our prior, copending application Ser. No. 318,340 filed Dec. 26, 1972.

BACKGROUND OF THE INVENTION

1. Field of the Invention.

The cephalosporin produced by the process of the present invention possesses in general the usual attributes of that family of antibacterial agents and is particularly useful in the treatment of bacterial infections by both oral and parenteral administration.

2. Description of the Prior Art.

The literature concerning this class of antibacterial agents has been reviewed frequently; two recent reviews are The Cephalosporins Microbiological, Chemical and Pharmacological Properties and Use in Chemotherapy of Infection, L. Weinstein and K. Kaplan, Annals of Internal Medicine, 72, 729–739 (1970) and Structure Activity Relationships Among Semisynthetic Cephalosporins, M. L. Sassiver and A. Lewis, Advances in Applied Microbiology, edited by D. Perlman, 13, 163–236 (1970), Academic Press, New York. Additional reviews which pay particular attention to the patent literature are found in U.S. Pat. Nos. 3,776,907, 3,776,175 and 3,759,904 and the last named concerns compounds closely related to the cephalosporin of the present invention.

7-[D-α-Amino-α-(p-hydroxyphenyl)acetamido]-3-(1,2,3-triazol-5-ylthiomethyl)-3-cephem-4-carboxylic acid is a new cephalosporin, also called BL–S640, which is described and claimed in the parent U.S. application Ser. No. 318,340 filed Dec. 26, 1972; the entire disclosure of that application is incorporated herein by reference. That application particularly discloses processes for the preparation of that new cephalosporin by enzymatic coupling and states that "Included in the scope of such processes are the use of an ester, e.g. the methyl ester, of that free acid with enzymes provided by various microorganism, e.g. those described by T. Takahashi et al., J. Amer. Chem. Soc., 94(11), 4035–4037 (1972) and by T. Nara et al., J. Antibiotics (Japan) 24(5), 321–323 (1971). The latter publication deals with the preparation of penicillins such as ampicillin; in that regard see U.S. Pat. Nos. 3,682,777, 3,717,548, 3,787,288 and U.S. Pat. No. 3,716,454 and the earlier publications and patents cited or referred to in that publication and those patents. The former publication dicloses the enzymatic synthesis of cephalosporins such as cephalexin, p-hydroxycephalexin, cephaloglycine and related compounds; see the corresponding West Germany 2,216,113 (Farmdoc 68428T) and see also U.S. Pat. No. 3,763,000 (Farmdoc 10859U; Belgium 787,793).

SUMMARY OF THE INVENTION

There is thus provided, according to the present invention, a process for the production of 7-[D-α-amino-α-(4-hydroxyphenyl)acetamido]-3-(1,2,3-triazol-5-ylthiomethyl)-3-cephem-4-carboxylic acid or a salt thereof which comprises contacting methyl D-(-)-α-amino-α-(4-hydroxyphenyl)acetate or an acid addition salt thereof with 7-amino-3-(1,2,3-triazol-5-ylthiomethyl)-3-cephem-4-carboxylic acid or a salt thereof in aqueous solution in the presence of enzyme derived from a microorganism selected from the group consisting of *Xanthomonas citri* (IFO 3835), *Acetobacter turbidans* (ATCC 9325) and *Pseudomonas melanogenum* (IFO 12020).

Preferred embodiments of the present invention include said process wherein the microorganism is used in the form of whole bacterial cells thereof or a culture broth thereof or an enzyme preparation thereof of its enzyme obtained in cell-free preparation by disruption of said microorganism.

Furthermore, microbial cells may be used which have been treated by chemical or physical procedures such as for example, acetone-, methanol- or ethanol-dried cells; spray dried cells; ground or sonically comminuted cells; cell-lysates by buffer solution or cetyl pyridinium chloride; refined enzymes obtained by known separation and refining procedures such as salting-out, fractionation precipitation, dialysis, adsorption chromatography, ion-exchange chromatography or gel-filtration of comminuted cells or cell-lysates; and the solid phase enzyme preparations or the insolublized enzymes prepared from adsorption of the acylation enzyme or producing microorganisms thereof on an inert carrier, which is not inactive for substrates and does not inactivate the acylating enzyme activity.

In the case of the acylation process with solid phase enzyme preparation, first the acylating enzyme or the producing microorganism thereof is adsorbed on the carrier. When the example is an exo-enzyme, the acylation enzyme can be adsorbed by adding the culture filtrate of the acylation enzyme-producing strain on the carrier. In the case of an endo-enzyme, natural microbial cells collected from cultures of acylation enzyme-producing microorganism or acetone- or ethanol-dried cells are adsorbed on the carrier, or a solution of acylation enzyme extracted from microbial cells is adsorbed on the carrier.

The carriers used in the present invention, which can be varied according to the kind of microorganisms, or in accordance with the preparation of acylation enzyme or microbial cells, are selected by considering the characteristics of the carriers adsorbing the enzyme or microbial cells which do not inactivate the acylating enzyme activity; the properties which do not remove the the adsorbed enzyme or microbial cells by washing; and the property of being inactive for each substrate and not adsorbing the resulting product. Examples which advantageously used are, when adsorbing an aqueous enzyme solution, active alumina, diatomaceous earth, acid clay, active clay, kaolin, calcium phosphate, hydroxyapatite or the like. To adsorb the microbial cells, CM-cellulose, CM-sephadex, DEAE-cellulose, TEAE-cellulose, diatomaceous earth or the like is advantageously used.

Other preferred embodiments are those wherein 2 to 20 moles of methyl D-(-)-α-amino-α-(4-hydroxyphenyl)acetate or an acid addition salt thereof are employed per mole of 7-amino-3-(1,2,3-triazol-5-ylthiomethyl)-3-cephem-4-carboxylic acid or a salt thereof and wherein the reaction is carried out in an aqueous medium having a pH value between 4 and 8 and preferably of about 5.5 – 6.5 and wherein the reaction is carried out in an aqueous medium at a temperature in the range of 20° C. to 45° C. and preferably at a temperature in the range of 30° C. to 40° C.

STARTING MATERIALS

7-Amino-3-(1,2,3-triazol-5-ylthiomethyl)-3-cephem-4-carboxylic acid. (II).

The reactions were conducted under a nitrogen atmosphere in a reaction vessel protected from light. The water and phosphate buffer were gassed vigorously with nitrogen prior to use to displace oxygen.

5-Amino-1,2,3-thiadiazole (10.3 g., 0.102 mole) was added to a solution of 8.16 g. of sodium hydroxide in 100 ml. of water. The mixture was heated rapidly to reflux and then refluxed for 10 min. to rearrange 5-amino-1,2,3-thiadiazole to 5-mercapto-1,2,3-triazole. To the reaction mixture containing 5-mercapto-1,2,3-triazole cooled in an ice bath was added 1100 ml. of ice cold 0.1M pH 6.4 phosphate buffer. The solution, which was at pH 10.5, was adjusted to pH 8.5 with 42% phosphoric acid. 7-Aminocephalosporanic acid (21.8 g., 0.08 mole) was added and the mixture heated at 50° for 4 hours. The clear solution was cooled in an ice bath and adjusted to pH 4.5 with conc. HCl. The precipitated product was collected by filtration, washed with water and air dried; 16.2 g.

The crude product (15.2 g.) was brought into solution with 600 ml. of methanol and 40 ml. of conc. HCl. After carbon treatment the solution was diluted with 1.5 l. of ice water and extracted once with ethyl acetate. The aqueous phase was concentrated at reduced pressure to remove methanol. The cold aqueous concentrate was adjusted slowly to pH 4.0 with 20% sodium hydroxide causing crystallization of the product. The product was collected by filtration, washed with water and methanol and dried in vacuo over phosphorus pentoxide; 11.4 g. The IR and NMR spectra were fully consistent for the desired product.

Anal. Calcd. for $C_{10}H_{11}N_5O_3S_2$: C, 38.42; H, 3.55; N, 22.40.

Found: C, 38.27, 38.26; H, 3.76, 3.40; N, 21.02, 21.00; $H_2O$, 1.70.

Purification of 7-Amino-3-(1,2,3-triazol-5-ylthiomethyl)-3-cephem-4-carboxylic acid (II).

Crude 7-amino-3-(1,2,3-triazol-5-ylthiomethyl)-3-cephem-4-carboxylic acid (16.1 g.) containing approximately 20 mole % of 7-aminocephalosporanic acid as an impurity, was brought into solution with 600 ml. of methanol and 40 ml. of conc. HCl. After carbon treatment, the solution was diluted with 1.5 l. of ice water and extracted once with ethyl acetate. The aqueous phase was concentrated at reduced pressure to remove methanol. The cold aqueous concentrate was then adjusted slowly to pH 4.0 with 20% sodium hydroxide causing the product to crystallize. The product was collected by filtration, washed with water and methanol and dried in vacuo over phosphorus pentoxide; 11.4 g. The NMR spectrum indicated that this product contained about 7 mole % of 7-aminocephalosporanic acid as an impurity.

The above purification procedure was repeated on 11.4 g. of the product using 425 ml. of methanol, 28 ml. of conc. HCl and 1 l. of ice water yielding 8.0 g. of product. The NMR spectrum was fully consistent for the desired product and indicated no trace of 7-aminocephalosporanic acid as an impurity.

Anal. Calcd. for $C_{10}H_{15}N_5O_3S_2$: C, 38.42; H, 3.55; N, 22.40.

Found: C, 39.06, 38.53; H, 3.56, 3.51; N, 22.05, 21.60; $H_2O$, 1.78.

7-Amino-3-[S-(1,2,3-triazole-5-yl)-thiomethyl]-3-cephem-4-carboxylic acid. (II).

Ten grams (0.075 mole) of 5-mercapto-1,2,3-triazole potassium salt was added to a stirred slurry of 19 g. (0.07 mole) of purified 7-aminocephalosporanic acid and 5.9 g. (0.07 mole) of $NaHCO_3$ in 350 ml. of 0.1M phosphate buffer (pH 6.4) and the mixture heated and stirred at 55° C. for 3½ hours under a nitrogen atmosphere. The resulting solution was cooled to 22° C. and the pH adjusted to 5.5 with 40% $H_3PO_4$. The resulting precipitate was filtered off, washed with cold water (50 ml.) and air dried. The yield of 7-amino-3-]S-(1,2,3-triazole-5-yl)-thiomethyl]-3-cephem-4-carboxylic acid was 8 g., dec. pt. 230° C. IR analysis showed some decomposition of the β-lactam ring but it was used "as is" for the next step.

Anal. Calcd. for $C_{10}H_{11}N_5O_3S_2$: C, 38.39; H, 3.54.

Found: C, 38.36; H, 3.78.

7-Amino-3-(1,2,3-triazol-5-ylthiomethyl)-3-cephem-4-carboxylic acid (II).

Two hundred seventy-two g. (1.0 mole) of 7-aminocephalosporanic acid was suspended in 3000 ml. of 0.1M phosphate buffer, pH 6.4, and 150 ml. of methyl isobutyl ketone followed by 84 g. (1.0 mole) of sodium bicarbonate (Note: The sodium bicarbonate was added in portions). Then 143 g. (1.0 mole) of 5-mercapto-1(H)-1,2,3-triazole potassium salt was added and the mixture stirred at 55° C. ± 1° C. under a nitrogen atmosphere for 4 hours. After 1 hr. the pH was readadjusted to 6.4 by addition of a small amount of 40% $H_3PO_4$. At the end of the 4 hr. heating period, 50 g. of "Darco KB" decolorizing charcoal was added and, after stirring for 15 min. at 55° C., the slurry was filtered hot through a diatomaceous earth ("Celite") pad. The pad was washed with 3 × 100 ml. water. The pH of the combined filtrates was adjusted while hot to 4.5 by slow addition of 6 N HCl. After cooling 30 min. at 0° C., the crude product was collected by filtration, washed with 2 × 200 ml. of cold water followed by 2 × 1000 ml. methanol and air dried.

The crude product was suspended in 3000 ml. of 50% methanol-water and 300 g. (1.5 mole) of p-toluenesulfonic acid was added. It was stirred for 15 min. and then 50 g. of "Darco KB" decolorizing charcoal was added. After stirring for 15 min. at 22° C., the slurry was filtered through a "Celite" pad and the pad washed with 2 × 100 ml. of 50% methanol-water. The pH of the combined filtrates was adjusted to 4.0 by addition of approximately 210 ml. of triethylamine. After cooling at 0° C. for 1 hour the product was collected by filtration, washed with 2 × 400 ml. 50% methanol-water and then 2 × 1000 ml. methanol. It was air dried.

This material was suspended in 2000 ml. water and 84 g. (1 mole) of sodium bicarbonate was added. After stirring for 10 min. at 22° C., 50 g. of "Darco KB" charcoal was added and, after stirring for 15 min. at 22° C., the slurry was filtered through a "Celite" pad. It was washed with 2 × 100 ml. water and the pH of the combined filtrates was adjusted to 3.5 by slow addition of 6 N HCl. After stirring for 10 min. at 22° C. it was cooled to 0° C. for 1 hr. The product was collected by filtration, washed with 2 × 200 ml. cold water and 2 × 1000 ml. acetone. After drying over $P_2O_5$ in a vacuum desiccator for 14 hr., at room temperature, the yield was 100 g; dec. pt. 230°C. The IR and NMR were consistent for the desired structure.

Anal. Calcd. for $C_{10}H_{11}N_5O_3S_2 \cdot 1/2\ H_2O$: C, 37.51; H, 3.75; N, 21.68. KF ($H_2O$), 2.8; KF ($H_2O$), 2.46 Found: C, 37.78; H, 3.69; N, 20.42.

Methyl D-(-)-α-amino-α-(4-hydroxyphenyl)acetate hydrochloride

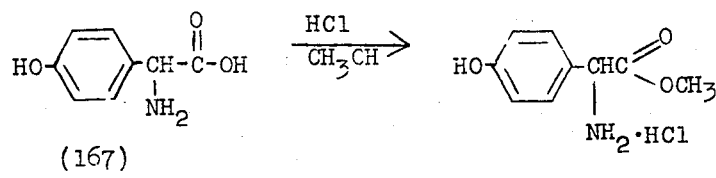

Procedure — 10 g. of D-(-)-α-amino-α-(4-hydroxyphenyl)acetic acid was suspended in 150 ml. absolute methanol and a stream of dry HCl gas was bubbled in rapidly without external cooling. After a solution was obtained it was cooled in ice and the gas was bubbled in until saturated at 0°–5° C. The solution was then stirred at 23° C. for 3 hr. The solvent was removed under vacuum and 150 ml. of absolute methanol added. After regassing the solution was stirred 2 hr. and the solvent removed by evaporation. The product crystallized out and was collected by filtration and dried over NaOH under vacuum. Recrystallization by solution in methanol followed by addition of anhydrous diethyl ether yielded 6 g., m.p. 185° C.

$[\alpha]_D^{25}$ —120.1 (C1, $H_2O$) Anal. Calcd. for $C_9H_{12}ClNO_3$: C, 50.02; H, 5.57; N, 6.45; Cl, 16.32. Found: C, 49.01; H, 5.46; N, 6.23; Cl, 15.90.

ATCC is an abbreviation for the American Type Culture Collection, Washington, D.C. and IFO for the Institute for Fermentation, Osaka, Japan from which the indicated cultures are available. All temperatures are in degrees Centigrade.

The following examples are given in illustration of, but not in limitation of, the present invention.

DESCRIPTION OF THE PREFERRED EMBODIMENTS

EXAMPLE 1

Enzymatic Synthesis of 7-[D-α-amino-α-(4-hydroxyphenyl)acetamido]-3-(1,2,3-triazol-5-ylthiomethyl)-3-cephem-4-carboxylic acid (BL-S640).

A culture of *Xanthomonas citri* (IFO 3835) was maintained on Difco heart infusion agar slants containing 0.1% glucose. A transfer from a slant culture was made into 100 ml. of sterile medium containing sodium glutamate 0.2%, yeast extract 0.2%, Difco bacto peptone 0.5%, dipotassium phosphate 0.2%, magnesium chloride 0.1%, ferrous sulfate 0.01% and sucrose 2.0% in distilled water (pH 7.2). This seed culture was grown for 24 hours at 28° C. on a rotary shaker at 250 rpm. A second flask containing 100 ml. of the same medium was inoculated using 5 ml. of the growth from the seed flask. This was incubated on a rotary shaker at 28° C. for 48 hrs. The cells from 15 ml. of broth were then collected by centrifugation, washed once with sterile distilled water and recentrifuged. The wash water was discarded and the substrates were added; 60 mg. of methyl D-(-)-α-amino-α-(4-hydroxyphenyl)acetate hydrochloride plus 25 mg. of 7-amino-3-(1,2,3-triazol-5-ylthiomethyl)-3-cephem-4-carboxylic acid. The mixture was made up to 5 ml. with 0.1M sodium citrate buffer (pH 5.5) and incubated at 37° C. in a reciprocating water bath.

The reaction was followed by paper strip chromatography on Whatman No. 1½ inch strips developed descendingly for 18 hrs. in a system containing n-butanol 6 parts, pyridine 4 parts, water 3 parts, and glacial acetic acid 1 part by volume. The appearance of a new bioactive zone having an Rf equivalent to known 7-[D-α-amino-α-(4-hydroxyphenyl)-acetamido]-3-(1,2,3-triazol-5-ylthiomethyl)-3-cephem-4-carboxylic acid, was detected by bioautography of the paper strips on seed agar (Baltimore Biological Laboratory) at pH 6.0 seeded with spores of *Bacillus subtilis* ATCC 6633.

The maximum yield obtained in 3½ hours of incubation was 36% of theoretical conversion to the cephalosporin derivative (BL-S640) based on the available 7-amino-3-(1,2,3-triazol-5-ylthiomethyl)-3-cephem-4-carboxylic acid present in the reaction mixture.

EXAMPLE 2

Equivalent results were obtained by substituting in the procedure of Example 1 for the culture used therein cultures of *Acetobacter turbidans* (ATCC 9325) and *Pseudomonas melanogenum* (IFO 12020) respectively.

EXAMpLE 3

Equivalent results are obtained by the replacement, in the procedure of Example 1, of the whole cell preparation of *Xanthomonas citri* (IFO 3835) with cell-free preparations of the enzymes thereof prepared by sonic disruption of an aqueous suspension of cells of this microorganism followed by filtration to remove cell particulate matter. The resulting aqueous solution can be used directly or after absorption on a carrier or encapsulation which makes it possible to conduct this enzymatic synthesis of BL–S640 as a continuous process.

We claim:

1. A process for the production of 7-[D-α-amino-α-(4-hydroxyphenyl)acetamido]-3-(1,2,3-triazol-5-ylthiomethyl)-3-cephem-4-carboxylic acid or a salt thereof which comprises contacting methyl D-(-)-α-amino-α-(4-hydroxyphenyl)acetate or an acid addition salt thereof with 7-amino-3-(1,2,3-triazol-5-ylthiomethyl)-3-cephem-4-carboxylic acid or a salt thereof in aqueous solution in the presence of enzyme derived from a microorganism selected from the group consisting of *Xanthomonas citri* (IFO 3835), *Acetobacter turbidans* (ATCC 9325) and *Pseudomonas melanogenum* (IFO 12020).

2. The process according to claim 1 wherein the micro-organism is used in the form of whole bacterial cells thereof.

3. The process according to claim 1 wherein the micro-organism is used in the form of a culture broth thereof.

4. The process according to claim 1 wherein the micro-organism is used in the form of an enzyme preparation thereof.

5. The process according to claim 1 wherein the micro-organism is used in the form of its enzymes obtained in cell-free preparation by disruption of said microorganism.

6. The process according to claim 1 wherein 2 to 20 moles of methyl D-(-)-α-amino-α-(4-hydroxyphenyl)acetate or an acid addition salt thereof are employed per mole of 7-amino-3-(1,2,3-triazol-5-ylthiomethyl)-3-cephem-4-carboxylic acid or a salt thereof.

7. The process according to claim 1 wherein the reaction is carried out in an aqueous medium having a pH value between 4 and 8.

8. The process according to claim 1 wherein the reaction is carried out in an aqueous medium having a pH value of about 5.5 – 6.5

9. The process according to claim 1 wherein the reaction is carried out in an aqueous medium at a temperature in the range of 20° C. to 45° C.

10. The process according to claim 1 wherein the reaction is carried out in an aqueous medium at a temperature in the range of 30° C. to 40° C.

\* \* \* \* \*